United States Patent [19]

Boller

[11] Patent Number: 5,046,864
[45] Date of Patent: Sep. 10, 1991

[54] TILTING PAD THRUST BEARING ASSEMBLIES

[76] Inventor: C. William Boller, 1380 Gordon Dr. S., Naples, Fla. 33940

[21] Appl. No.: 652,667

[22] Filed: Feb. 8, 1991

[51] Int. Cl.[5] .............................................. F16C 17/06
[52] U.S. Cl. .................................... 384/308; 384/306
[58] Field of Search ............... 384/122, 224, 302–304, 384/306–309, 312

[56] References Cited

U.S. PATENT DOCUMENTS

| | | | |
|---|---|---|---|
| 1,361,073 | 12/1920 | Kingsbury | 384/224 |
| 1,666,521 | 4/1928 | Allen | 384/306 |
| 2,102,534 | 12/1937 | Howarth | 384/308 |
| 2,565,116 | 8/1951 | Baudry | 384/308 |
| 3,655,250 | 4/1972 | Sprenger | 384/304 |
| 3,817,586 | 6/1974 | Elwell | 384/306 |
| 3,912,344 | 10/1975 | McCafferty | 384/304 |
| 4,403,873 | 9/1983 | Gardner | 384/122 X |

Primary Examiner—Thomas R. Hannon
Attorney, Agent, or Firm—Merrill N. Johnson

[57] ABSTRACT

An equalizing tilting pad assembly for thrust bearings and the like which includes a retaining ring housing an arrangement of upper and lower equalizing links and supporting a number of similar tilting pads each having a spherically curved contact surface on its lower face. The upper and lower equalizing links lie within the retaining ring in an endless overlapping arrangement with each upper link touching at contact points two adjacent lower links. Each upper link is pivotally mounted on a spherical ball supported by the retaining ring and each lower link is pivotally mounted on the retaining ring by cylindrical members lying perpendicular to the axis of the retaining ring, and the contact points between adjacent upper and lower links lie in a common plane when the equalizing links are in a position of zero pivoting angle.

9 Claims, 4 Drawing Sheets

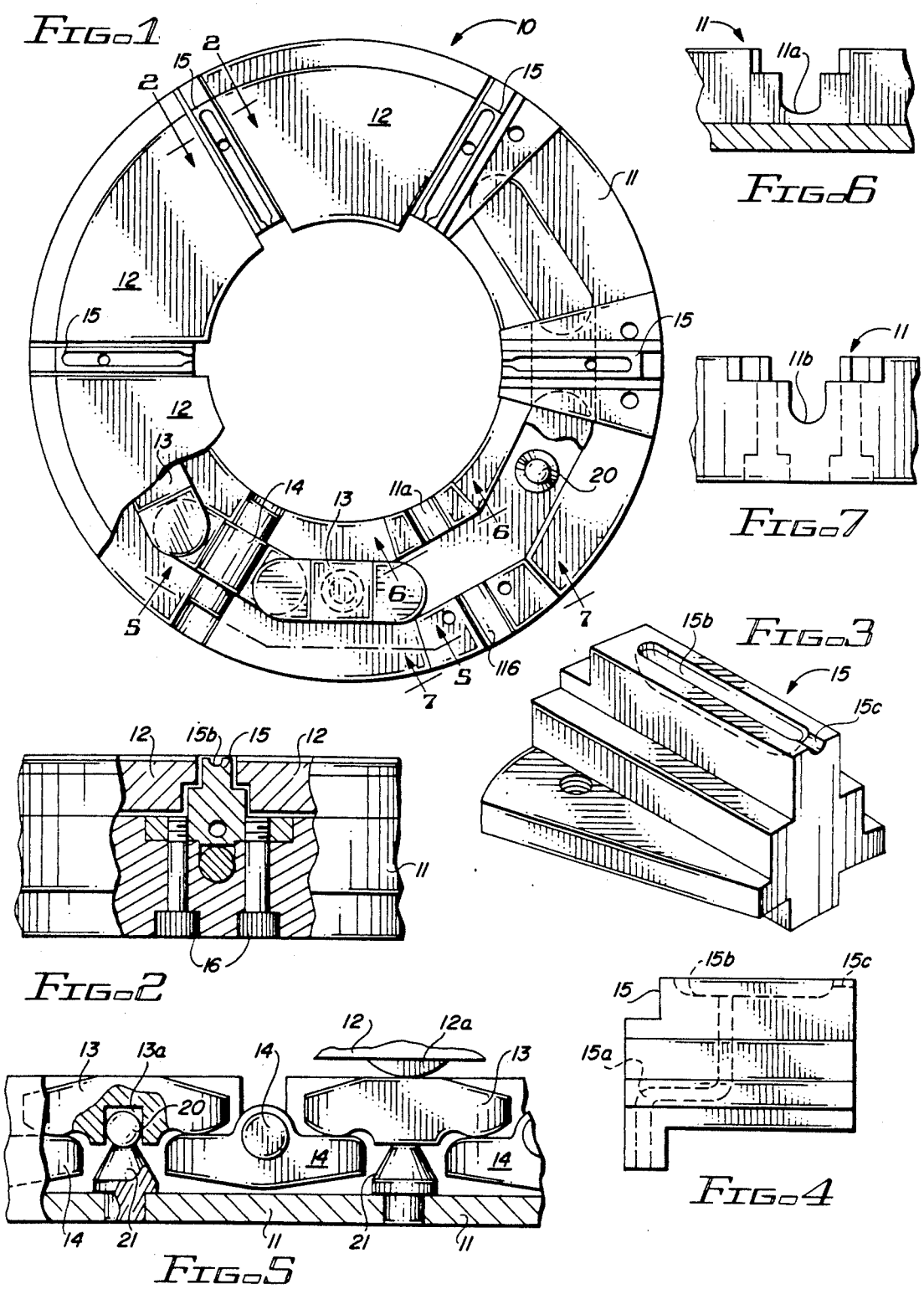

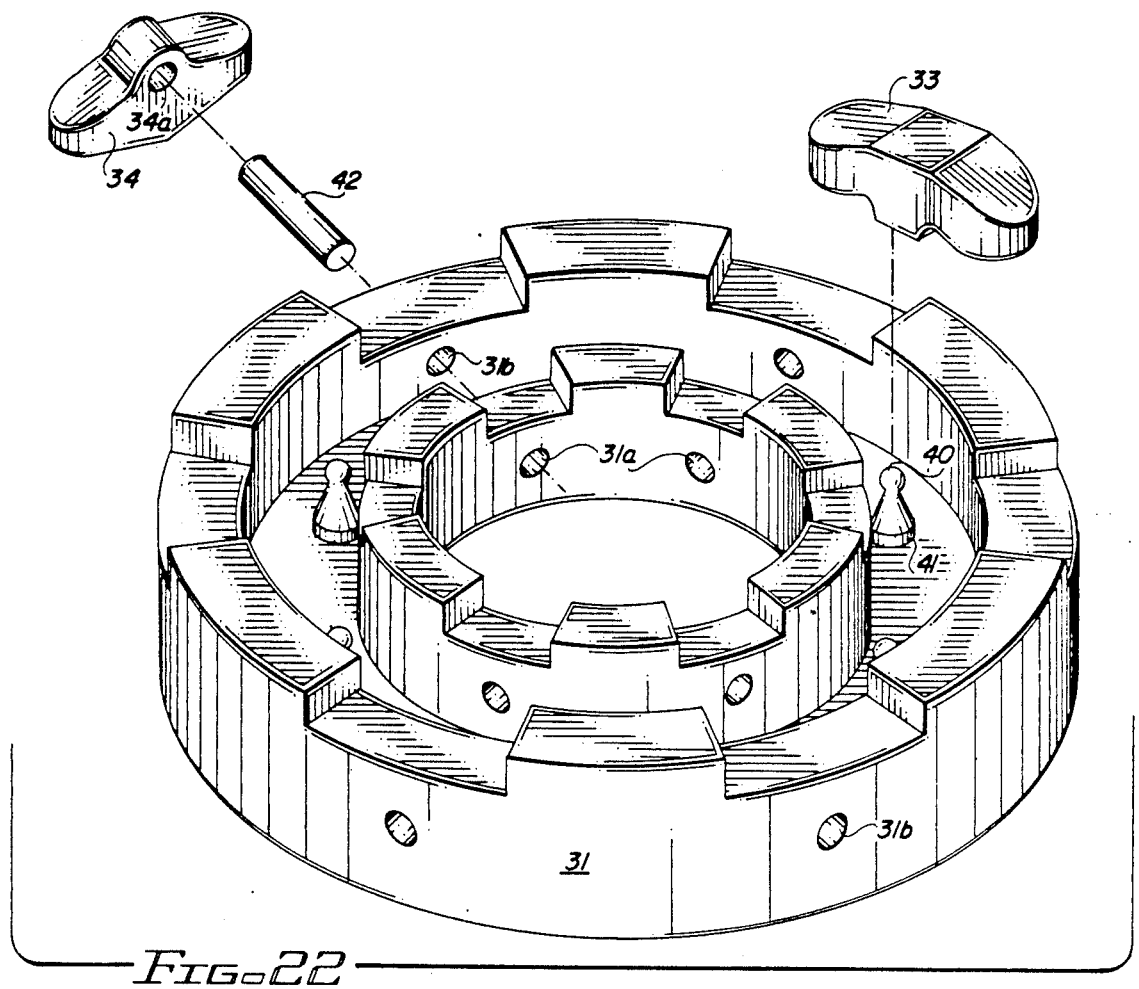
FIG.-22
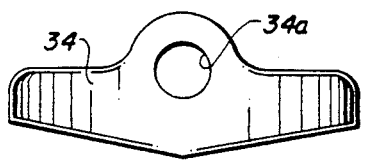
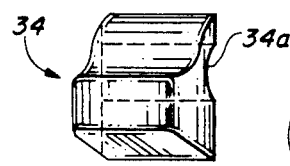
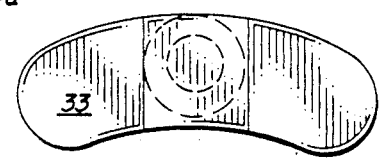
FIG.-23  FIG.-24  FIG.-25
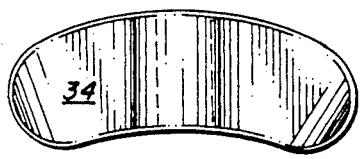
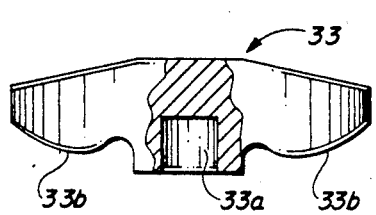
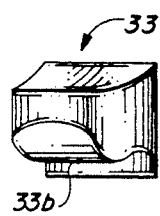
FIG.-26  FIG.-27  FIG.-28

5,046,864

TILTING PAD THRUST BEARING ASSEMBLIES

BACKGROUND AND SUMMARY OF THE INVENTION

This invention relates to tilting pad thrust bearing assemblies and more particularly to a unique arrangement of equalizing links for use in a tilting pad thrust bearing assembly or other device.

Equalizing links have been used in tilting pad thrust bearings for many years. In order to reduce friction effects, various shapes and arrangements of the equalizing links used in tilting pad thrust bearings have been proposed. See, for example, U.S. Pat. Nos. 1,361,073; 1,666,521; 3,655,250 and 4,403,873, all showing different arrangements of equalizing links and tilting pads. However, these designs either do not equalize at all under load, cannot be used with the type of thrust pads currently in use, or they are uneconomical to manufacture.

Based upon my more than 40 years experience in the development and manufacture of tilting pad thrust bearing assemblies, I have invented an essentially friction free tilting pad assembly for use in thrust bearings and other devices.

In tilting pad thrust bearings such as those shown in the foregoing patents, the thrust load along the axis of the rotating shaft is transmitted from a collar affixed to the shaft to a plurality of individual tilting thrust pads arranged in a circle, then to a plurality of upper equalizing links, then to a plurality of lower equalizing links, and finally to the stationary machine housing.

The thrust collar mounted on the rotating shaft has a planar surface which intersects the axis of the rotating shaft at exactly 90°. Since the individual tilting pads are independent of each other, the loads carried by each pad will vary according to its distance from the planar surface of the rotating collar. Variations in the distance between the planar surface of the collar and the individual pads can result from manufacturing tolerances on the individual component parts or from machine housing mounting surfaces for the retaining ring being out of square with the axis of the shaft. The purpose of the equalizing links is to promptly and automatically move the several thrust pads into positions equidistant from the rotating planar surface of the shaft's collar resulting in equal thrust pad loads.

Tilting pad thrust bearings depend upon hydrodynamic action to produce the fluid film pressure which supports the rotating thrust load and the capacity of the fluid film bearing will be greatest when a uniform distance is maintained between each of the individual thrust pads and the planar surface of the rotating collar.

Most state of the art equalizing links and those shown in the aforementioned patents do not promptly equalize under load because of the friction generated by the upper and lower links sliding across each other seeking to adjust due to changes requiring prompt movement of the upper equalizing links. These changes include changes caused by thermal expansion or contraction of the machine housing during operation and changes due to misalignment of one or more of the bearing components.

Simply stated, my invention eliminates or reduces to a bare minimum the sliding friction generated by prior tilting pad arrangements. By my invention the contact between the adjacent surfaces of links is a rolling contact rather than a sliding contact.

The superiority of this invention over state of the art designs is accomplished by a combination of the following design features:

1. The contact points between adjacent upper and lower equalizing links and the pivot axes of those adjacent links lie in a common plane when the equalizing links are in a position of zero pivoting angle.
2. The lower links are supported on horizontally mounted cylindrical pins.
3. The contact points between adjacent thrust pads and upper links are spherical surfaces of large radius.

In addition to the foregoing design features providing a rolling and hence essentially friction free movement of the equalizing links and the tilting pads, the arrangement provides low bearing pressures with the tilting pad retaining ring.

My invention can be used with a retaining ring whose inner boundry is either an equilateral polygon or circular in plan view, although it has the most efficient equalizing movement in its polygonal form. However, there will be manufacturing economies in using the more common circular form.

The thrust pad load is transmitted to the upper equalizing link through the thrust pad support. The upper equalizing link transmits its load to the lower equalizing link by interacting contact points between the links. These contact points are located to provide equal lever arms from the pivot points of the equalizing links. The surface of the lower link for interacting contact is in a plane containing the axis of the pivoting point of the lower equalizing link. The interacting contact surface of the upper link is a slightly crowned cylinder whose axis is radial and bisects the angle between the radial pivoting axis of adjacent upper and lower equalizing links. The axis of this crowned cylinder is in a plane parallel to the pivoting axis of the upper link. The axis of pivoting of the upper equalizing link is the result of the shape and fit of the link in the track of the retaining ring and the tangential retaining pin.

The lower equalizing link transmits its load into the retaining ring by a cylindrical member which is also the pivot point of the lower link. This cylindrical member can be stub shafts integral with the lower link and having a 180° bearing surface in the retaining ring. The cylindrical member can alternatively be a fixed round pin in the retaining ring extending through a hole in the lower link. In either design the load transmitting member is adequately proportioned to produce low bearing pressures.

The upper equalizing link is retained tangentially by a ball member permitting the necessary rise and fall of the upper equalizing link to produce equalization of the thrust pad loads as required. A radial pin extending inward from the outer rim of the retaining ring and engaging a vertical slot in the upper equalizing link would provide the same design requirements. In either design the center of the ball or pin must be in the same plane as the pivoting point of the lower equalizing link and the interacting contact points in the position of zero pivoting angle of all links.

In this design the vertical sides of the equalizing links can be parallel planar surfaces or concentric cylindrical surfaces. The design using parallel planar surfaces allows greater link pivoting movement with closer clearances with the retaining ring walls with resulting greater equalization movement for uses other than thrust bearings. The cylindrical design allows sufficient pivoting movement for the relatively small equalizing movement required for most tilting pad thrust bearings.

The compact unique design of my equalizing links provides sufficient space in the retaining ring to permit screws to secure a separate piece to be used as a thrust pad separator. The thrust pad separator can be varied to permit a wide range of lubrication systems such as flood, spray, and directed lubrication. The separator can also be varied to permit offset thrust pad supports as well as the common center thrust pad support.

The design features of my invention will meet the space requirements which have been accepted by the major equalizing tilting pad thrust bearing manufacturers. All components are sized to carry accepted industry rated loads with ample factors of safety using common heat treated materials.

I have constructed a prototype of the titling pads and equalizing links made in accordance with my invention and preliminary tests indicate that the assembly operates essentially friction free with rolling contact between adjacent upper and lower equalizing links.

DESCRIPTION OF THE DRAWINGS

FIG. 1 is a plan view of a preferred embodiment of a tilting pad thrust bearing assembly partially broken away to show some of the features of my invention.

FIG. 2 is a fragmentary side view partially broken away taken along line 2—2 of FIG. 1.

FIG. 3 is a perspective view of one of the pad separators used in the assembly shown in FIG. 1.

FIG. 4 is a side elevational view of the separator showing in dotted lines the oil line within the separator.

FIG. 5 is a fragmentary side view partially broken away showing upper and lower equalizing links and one of the tilting pads taken along line 5—5 of FIG. 1.

FIG. 6 is a fragmentary side view showing a portion of the retaining ring taken along line 6—6 of FIG. 1.

FIG. 7 is a fragmentary side view of the retaining ring taken along line 7—7 of FIG. 1.

FIG. 22 is a perspective view of the retaining ring and one each of the upper equalizing links, the lower link pins and the lower link shown in FIG. 15.

FIG. 23 is a side elevational view of one of the lower equalizing links used in the assembly shown in FIG. 15.

FIG. 24 is an end view of the lower equalizing link shown in FIG. 23.

FIG. 25 is a top plan view of one of the upper equalizing links used in the assembly shown in FIG. 15.

FIG. 26 is a top plan view of the lower equalizing link shown in FIGS. 23 and 24.

FIG. 27 is a side elevational view partially broken away of the upper equalizing link shown in FIG. 25.

FIG. 28 is an end view of the upper equalizing link shown in FIGS. 25 and 27.

DETAILED DESCRIPTION OF THE PREFERRED EMBODIMENTS

Figure 8:
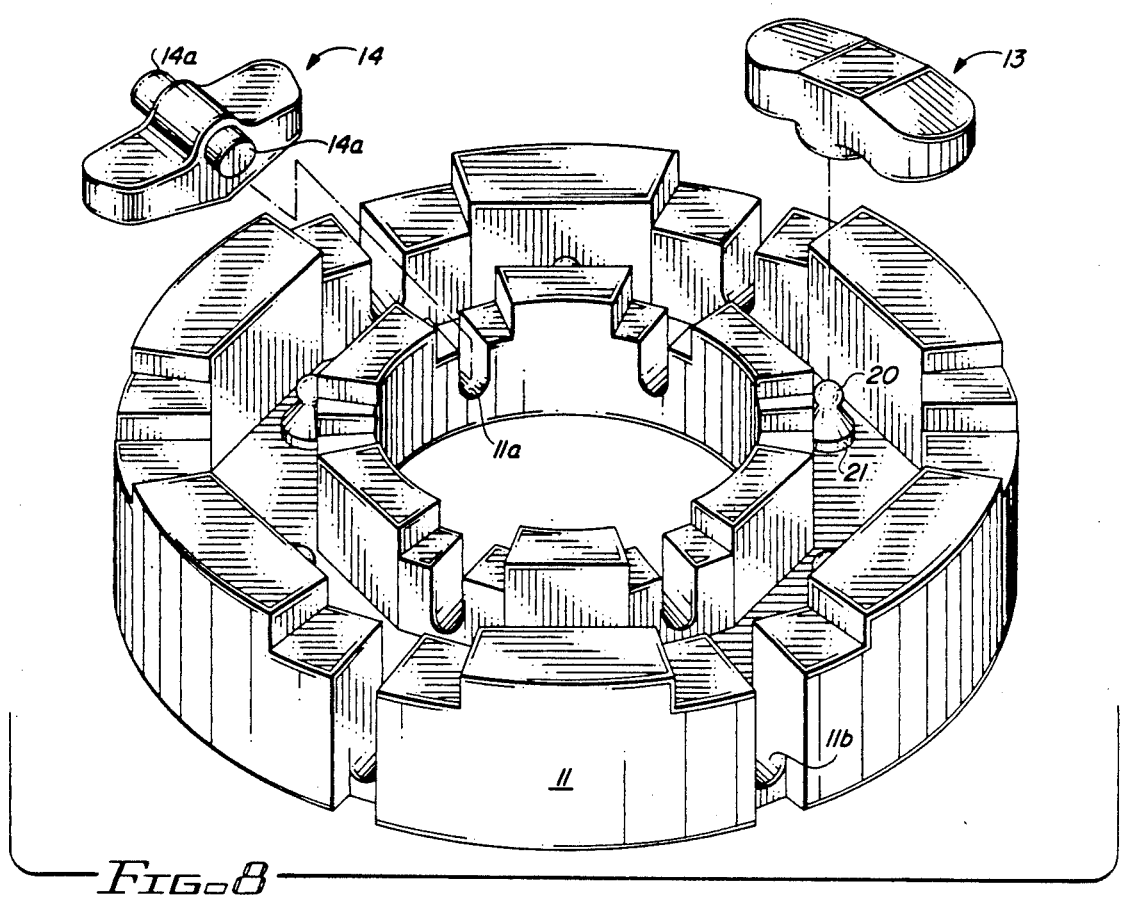
FIG. 8 is a perspective view of the retaining ring and one each of upper and lower equalizing links of the assembly shown in FIG. 1.
Figure 9:
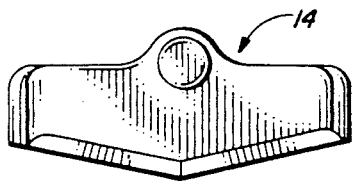
FIG. 9 is a side elevational view of one of the lower equalizing links used in the assembly shown in FIG. 1.

A tilting pad thrust bearing assembly 10 is shown in FIG. 1 in which the equalizing links are arranged into a polygonal pattern within the retaining ring 11. In FIG. 1 three of the assembly's six tilting pads 12 have been removed and one is partially broken away to show some of upper equalizing links 13 and lower equalizing links 14. The rotatable shaft passing axially through ring 11 and the shaft's collar riding on tilting pads 12 are not shown in FIG. 1.

Assembly 10 also includes six tilting thrust pad separators 15, one of which is shown in perspective in FIG. 3. Separator 15 is bolted into ring 11 by bolts 16 shown in FIG. 2 and includes oil passageway 15a and oil reservoir 15b containing groove 15c as best shown in FIGS. 3 and 4. Thrust pad separators 15 can be modified to accomodate other lubrication systems as desired.

My unique arrangement and design of the assembly's equalizing links is shown in FIGS. 1, 5, 8 and 9 through 14. The links overlapping arrangement is best shown in FIG. 5 which also shows a portion of one tilting pad 12 with the pad's hardened steel spherically curved contact surface 12a in contact with the upper surface of upper equalizing link 13. Upper links 13 are pivotably mounted on a spherical ball 20 integral with a pin 21 supported by retaining ring 11. Ball 20 is housed within a cylindrical slot 13a whose axis is parallel to the central axis of ring 11 which, of course, is the axis of the rotatable shaft not shown.

Figure 11:
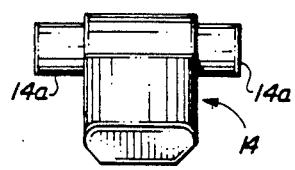
FIG. 11 is an end view of the lower equalizing link shown in FIGS. 9 and 10.
Figure 13:
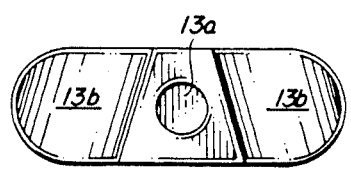
FIG. 13 is a bottom plan view of the upper equalizing link shown in FIG. 12.
Figure 10:
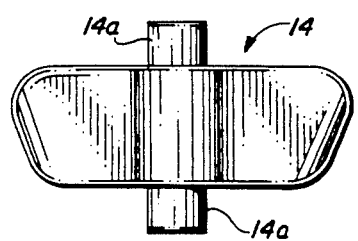
FIG. 10 is a top plan view of the lower equalizing link shown in FIG. 9.
Figure 12:
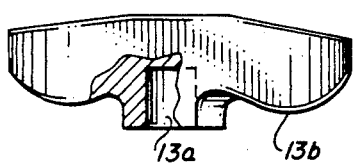
FIG. 12 is a side elevational view partially broken away of one of the upper equalizing links used in the assembly shown in FIG. 1.
Figure 14:
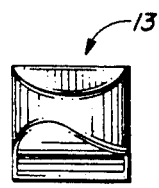
FIG. 14 is an end view of the upper equalizing link shown in FIGS. 12 and 13.

Lower equalizing links 14 are shown in FIG. 5 in an overlapping arrangement with upper links 13. Each lower link 14 includes a pair of cylindrical stub shafts 14a on opposite sides of the link as best shown in FIGS. 8 and 11. Shafts 14a are supported in retaining ring 11 within a pair of U-shaped bearing surfaces 11a and 11b shown respectively in FIGS. 6 and 7. The pivoting axes of cylindrical shafts 14a and bearing surfaces 11a and 11b coincide and intersect at 90° the central axis of retaining ring 11.

As shown in FIG. 5 thrust pad 12 transmits its load through its spherical contact surface 12a to upper equalizing link 13 which in turn transmits its load to two adjacent lower links 14 interacting contact points between links 13 and links 14, which provide equal lever arms from the pivot points of the equalizing links. The interacting contact surfaces 13b of the upper links 13 are slightly crowned cylinders whose axis is radial and which bisects the angle between the radial pivoting axis of link 13 formed by ball 20 retained within slot 13a of the upper link and the pivoting axis of the adjacent lower link 14. The axis of the two crowned cylinders 13b on the lower surfaces of link 13 lie in a plane parallel to the pivoting axis of the upper link.

Each lower link 14 transmits its load into retaining ring 11 by its pair of shafts 14a bearing against surfaces 11a and 11b of the retaining ring. Shafts 14a are designed and sized to produce low bearing pressures. The pivoting point of lower links 14 is the axis of shafts 14a and this pivoting point lies in the same plane as the pivoting point of the upper links and the interacting contact points of the upper and lower links when they are in a position of zero pivoting angle of all the links as is shown in FIG. 5.

A prototype of the embodiment of my invention as described and shown in FIGS. 1-14 operated essentially friction free and with rolling contact between adjacent upper links 13 and lower links 14.

As best shown in FIGS. 1 and 8, the overlapping upper and lower links are arranged in a polygonal pattern within the retaining ring 11. While providing minimal friction losses in this polygonal arrangement, some economies in manufacture can be obtained by forming and arranging the upper and lower equalizing links in a truly circular pattern and such an arrangement is shown in FIGS. 15-28.

Figure 15:
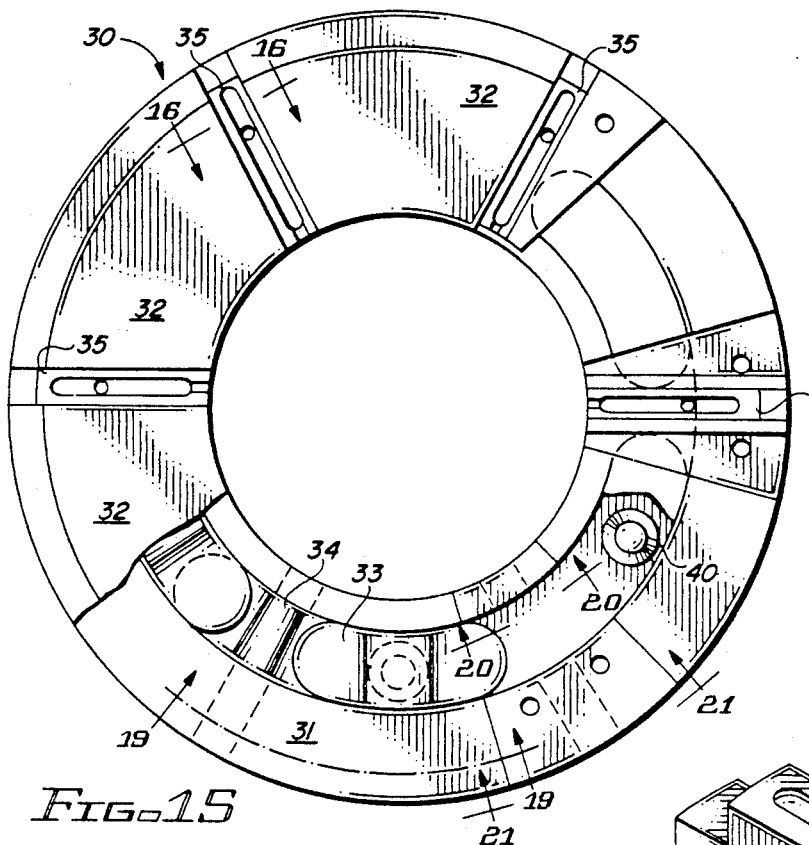
FIG. 15 is a second preferred embodiment of a tilting pad thrust bearing assembly partially broken away to show features of my invention.
Figure 20:
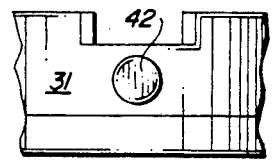
FIG. 20 is a fragmentary side view showing a portion of the retaining ring taken along line 20—20 of FIG. 15.
Figure 21:
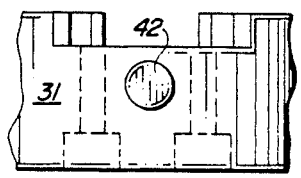
FIG. 21 is a fragmentary side view of the retaining ring taken along line 21—21 of FIG. 15.

Tilting pad thrust bearing assembly 30 is shown in FIG. 15 with overlapping upper equalizing links 33 and lower equalizing links 34 arranged in a circle within retaining ring 31. In FIG. 15 two of the assembly's six tilting thrust pads 32 have been removed and two have been partially broken away to show the overlapping circular arrangement of the equalizing links. As in FIGS. 1 and 8 previously described, the rotatable shaft which passes axially through retaining ring 31 and the shaft's annular collar riding on the six tilting pads 32 are not shown in FIG. 15.

Figure 16:
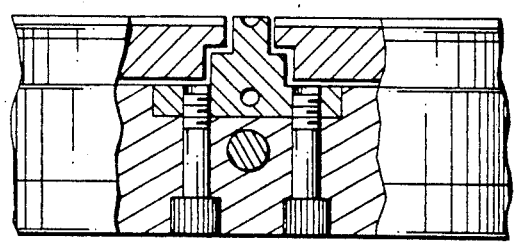
FIG. 16 is a fragmentary side view partially broken away taken along line 16—16 of FIG. 15.
Figure 17:
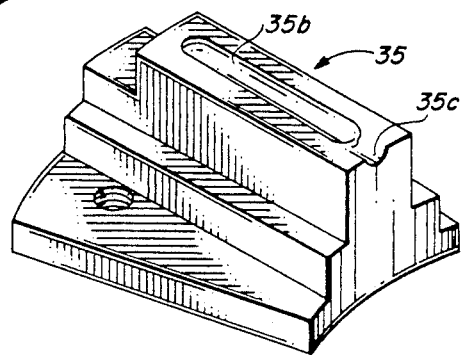
FIG. 17 is a perspective view of one of the pad separators used in the assembly shown in FIG. 15.
Figure 18:
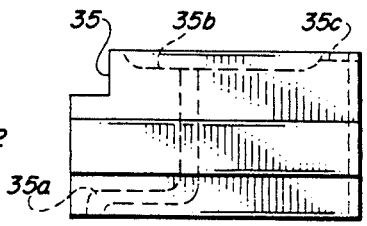
FIG. 18 is a side elevational view of the pad separator showing in dotted lines the oil line within the separator.

Assembly 30 preferably includes six tilting pad separators 35, one of which is shown in perspective in FIG. 17. Each separator 35 is bolted into retaining ring 31 by two bolts 36 as illustrated in FIG. 16 and it includes an oil passageway 35a and an oil reservoir 35b which contains a small slot or groove 35c as shown in FIGS. 17 and 18. Assembly 30 can be modified to accomodate other oil lubrication systems than the one shown and described.

Figure 19:
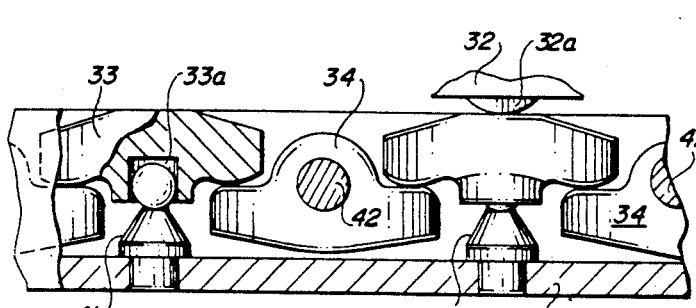
FIG. 19 is a fragmentary side view partially broken away showing upper and lower equalizing links and one of the tilting pads taken along line 19—19 of FIG. 15.

The overlapping arrangement of my unique equalizing links in a circle within the retaining ring is shown in FIGS. 15, 19 and 22 through 28. The overlapping arrangement of the links is best shown in FIG. 19 which includes a broken away portion of one tilting pad 32 with the pad's case hardened steel spherically curved contact surface 32a in direct contact with the upper surface of upper equalizing link 33. Each upper link 33 is pivotably mounted on a spherical ball 40 which is preferably integral with a pin 41 supported by retaining ring 31. Ball 40 lies within a cylindrical slot 33a located in the center of the bottom surface of the upper link. The axis of cylindrical slot 35a lies parallel to the central axis of retaining ring 31 when equalizing link 25 is in a position of zero pivoting angle as is shown in FIG. 19.

FIG. 19 also shows one of the lower equalizing links 34, each of which contains a cylindrical slot 34a. Each lower link 34 is pivotably mounted on a cylindrical pin 42 the opposite ends of which are fitted into a pair of cylindrical bearing surfaces 31a and 31b bored radially of and perpendicular to the central axis of retaining ring 31 as best shown in FIG. 22. Thus the pivoting axis of lower links 34 is radial of and intersects the central axis of ring 31 and, of course, the axis of rotation of the shaft not shown.

As shown in FIG. 19 each thrust pad 32 transmits its load through its spherical contact surface 32a to the upper surface of upper link 33 which in turn transmits this load to two adjacent lower links 34 through their interacting contact points. These interacting contact points lie at equal distances from the pivoting points of both the upper and lower links.

The interacting contact surfaces 33b of upper links 33 are each identically slightly crowned cylindrical surfaces whose axis is radial and bisects the angle between the radial pivoting axis of upper link 33 and the pivoting axis of the adjacent lower link 34. For best results, the axes of the two crowned cylindrical surfaces on the lower surface of each upper link 33 lie in the same plane as the pivoting axis of upper link 33 as shown in FIG. 19.

Each lower link 34 transmits its load into retaining ring 31 by pin 42 fitted ino the ring's slots 31a and 31b. These pins are designed and sized to produce low bearing pressures onto link 34. The pivoting point of each lower link 34 is, of course, the axis of pin 42 and this pivoting point lies in the same plane as the pivoting points of the upper links 33 and also the interacting contact points of the upper and lower links when the links are in a position of zero pivoting angle as is shown in FIG. 19.

Two preferred embodiments of my unique arrangement and design of equalizing links for thrust bearings and the like have been described, one embodiment in which the links are arranged into a polygon and the other in which they are arranged in a circle. In both arrangements adjustments in the positions of the tilting pads are made essentially without friction losses resulting from the rolling contact between adjacent upper and lower links. While two embodiments have been shown and described, no limitations as to the scope of my invention should be implied from these descriptions. The true scope of my invention is limited only by the following claims.

I claim:

1. An equalizing tilting pad thrust bearing assembly comprising
   a plurality of similar arcuate shaped tilting pads each having flat upper and lower faces and on its lower face a spherically curved contact surface,
   a retaining ring designed to house within said ring a plurality of upper and lower equalizing links and to support the tilting pads,
   a plurality of upper equalizing links, and
   an equal number of lower equalizing links,
   the upper and lower equalizing links lying in an endless overlapping arrangement within the retaining ring, each upper link touching at contact points two lower links,
   each lower equalizing link being pivotally mounted on the retaining ring by cylindrical members lying perpendicular to the axis of the ring,
   each upper equalizing link being pivotally mounted on a spherical ball supported by the retaining ring,
   the contact points between adjacent upper and lower equalizing links and the pivot axes of adjacent links lying in a common plane when the equalizing links are in a position of zero pivoting angle, and the contact points between adjacent tilting pads and upper equalizing links are the spherically curved contact surfaces of the tilting pads.

2. An equalizing tilting pad thrust bearing assembly as set forth in claim 1 wherein the two contact points at which each upper link touches an adjacent lower link lie at equal distances from the pivoting axis of that upper link.

3. An equalizing tilting pad thrust bearing assembly as set forth in claim 1 wherein the two surfaces of each upper link which provide contact points with the adjacent lower links are identical slightly crowned cylinders whose axes are radial of the central axis of the retaining ring and which bisect the angle formed by the intersection of the radial pivoting axis of that upper link and the radial pivoting axis of an adjacent lower link.

4. An equalizing tilting pad thrust bearing assembly comprising
- a plurality of identical arcuate shaped tilting pads each having flat upper and lower faces and on its lower face a spherically curved contact surface,
- a retaining ring designed around a central axis to house within said ring a plurality of upper and lower equalizing links and to support the tilting pads,
- a plurality of identical elongated upper equalizing links, and
- an equal number of identical elongated lower equalizing links,
- the upper and lower links being arranged in an endless overlapping polygon within the retaining ring, each upper link touching at contact points two adjacent lower links,
- each lower equalizing link being pivotally mounted on the retaining ring by cylindrical stub shafts on the link lying perpendicular to the axis of the ring,
- each upper equalizing link being pivotally mounted on a spherical ball supported by the retaining ring and fitted into a cylindrical slot in the link,
- the contact points between adjacent upper and lower equalizing links and the pivot axes of adjacent links lying in a common plane when the equalizing links are in a position of zero pivoting angle, and
- the contact points between adjacent tilting pads and upper equalizing links are the spherically curved contact surfaces of the tilting pads.

5. An equalizing tilting pad thrust bearing assembly as set forth in claim 4 wherein the two contact points at which each upper link touches an adjacent lower link lie at equal distances from the pivoting axis of that upper link.

6. An equalizing tilting pad thrust bearing assembly as set forth in claim 4 wherein the two surfaces of each upper link which provide contact points with the adjacent lower links are identical slightly crowned cylinders whose axes are radial of the central axis of the retaining ring and which bisect the angle formed by the intersection of the radial pivoting axis of that upper link and the radial pivoting axis of an adjacent lower link.

7. An equalizing tilting pad thrust bearing assembly comprising
- a plurality of identical arcuate shaped tilting pads each having a flat upper face and a lower face and on its lower face a spherically curved contact surface,
- a retaining ring designed around a central axis to house within said ring a plurality of upper and lower equalizing links and to support the tilting pads,
- a plurality of identical upper equalizing links, and
- an equal number of identical lower equalizing links,
- the upper and lower links being arranged in an endless overlapping circle within the retaining ring, each upper link touching at contact points two adjacent lower links,
- each lower equalizing link being pivotably mounted on the retaining ring on a cylindrical pin running through a passageway in the link providing peripheral contact with retaining ring and lying perpendicular to and intersecting the axis of the ring,
- each upper equalizing link being pivotally mounted on a spherical ball fitted into a cylindrical slot in the link and the ball supported by the retaining ring,
- the contact points between adjacent upper and lower equalizing links and the pivot axes of adjacent links lying in a common plane when the equalizing links are in a position of zero pivoting angle, and
- the contact points between adjacent tilting pads and upper equalizing links are the spherically curved contact surfaces of the tilting pads.

8. An equalizing tilting pad thrust bearing assembly as set forth in claim 7 wherein the two contact points at which each upper link touches an adjacent lower link lie at equal distances from the pivoting axis of that upper link.

9. An equalizing tilting pad thrust bearing assembly as set forth in claim 7 wherein the two surfaces of each upper link which provide contact points with the adjacent lower links are identical slightly crowned cylinders whose axes are radial of the central axis of the retaining ring and which bisect the angle formed by the intersection of the radial pivoting axis of that upper link and the radial pivoting axis of an adjacent lower link.

* * * * *